United States Patent
Orth et al.

(10) Patent No.: US 7,889,710 B2
(45) Date of Patent: Feb. 15, 2011

(54) WIRELESS MESH NETWORK WITH LOCALLY ACTIVATED FAST ACTIVE SCHEDULING OF WIRELESS MESSAGES

(75) Inventors: Kelly M. Orth, Apple Valley, MN (US); Philip G. Ostby, Cologne, MN (US)

(73) Assignee: Rosemount Inc., Eden Prairie, MN (US)

( * ) Notice: Subject to any disclaimer, the term of this patent is extended or adjusted under 35 U.S.C. 154(b) by 944 days.

(21) Appl. No.: 11/803,953

(22) Filed: May 16, 2007

(65) Prior Publication Data

US 2008/0080475 A1 Apr. 3, 2008

Related U.S. Application Data

(60) Provisional application No. 60/848,608, filed on Sep. 29, 2006.

(51) Int. Cl.
*H04J 3/06* (2006.01)
(52) U.S. Cl. ................... 370/350; 370/229; 370/230; 370/235
(58) Field of Classification Search ......... 370/229–236, 370/277–282, 294, 311–314, 345–350, 442–444, 370/458–460, 465, 468, 478, 498, 503, 507–509; 455/500, 507, 527, 68–70, 88, 343.1–343.5
See application file for complete search history.

(56) References Cited

U.S. PATENT DOCUMENTS

| | | | |
|---|---|---|---|
| 6,363,062 B1 | 3/2002 | Aaronson et al. | |
| 7,075,890 B2 | 7/2006 | Ozer et al. | |
| 2002/0065631 A1 | 5/2002 | Loechner | |
| 2002/0167954 A1* | 11/2002 | Highsmith et al. | 370/406 |
| 2005/0002364 A1* | 1/2005 | Ozer et al. | 370/338 |
| 2005/0111361 A1* | 5/2005 | Hosein | 370/230 |
| 2005/0201349 A1 | 9/2005 | Budampati | |
| 2005/0281215 A1 | 12/2005 | Budampati et al. | |
| 2006/0002368 A1 | 1/2006 | Budampati et al. | |
| 2006/0111040 A1 | 5/2006 | Jenkins et al. | |
| 2006/0227729 A1 | 10/2006 | Budampati et al. | |
| 2006/0274644 A1 | 12/2006 | Budampati et al. | |

(Continued)

FOREIGN PATENT DOCUMENTS

WO 03023536 3/2003

*Primary Examiner*—Kamran Afshar
*Assistant Examiner*—Neda Behrooz
(74) *Attorney, Agent, or Firm*—Kinney & Lange, P.A.

(57) ABSTRACT

A wireless mesh network is formed by nodes having a regular active schedule for transmitting and receiving messages, and a fast active schedule mode that is locally activated when a demand exists for transmission of a larger number of messages. As each node transmits a message to another node, the transmitting node includes a message buffer queue parameter that indicates the number of messages in the transmitting nodes, pending message queue. The receiving node determines, based upon the message buffer queue parameter received and its own capacity, whether to continue on the regular schedule, or to activate the fast active schedule. If the fast active schedule is activated, the receiving node sends a special acknowledge message back to the sending node, so that both nodes will transmit and receive messages over a fast active schedule link until the message buffer of the sending node has been reduced and the fast active schedule can be deactivated in favor of the regular active schedule.

19 Claims, 1 Drawing Sheet

U.S. PATENT DOCUMENTS

| | | |
|---|---|---|
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0133556 A1* | 6/2007 | Ding et al. ............... 370/395.4 |
| 2007/0201369 A1* | 8/2007 | Pedersen et al. ............ 370/235 |

* cited by examiner

WIRELESS MESH NETWORK WITH LOCALLY ACTIVATED FAST ACTIVE SCHEDULING OF WIRELESS MESSAGES

CROSS-REFERENCE TO RELATED APPLICATION

This application claims benefit of an earlier application entitled SELF-FORMING SUB-NETWORKS AS PART OF A MESH NETWORK: LOCALLY ACTIVATED FAST ACTIVE SCHEDULING OF WIRELESS MESSAGES, Ser. No. 60/848,608 filed Sep. 29, 2006.

BACKGROUND OF THE INVENTION

The present invention relates to wireless mesh networks. In particular, the invention relates to a wireless mesh network in which nodes in the network locally determine scheduling of messages based upon unmet message demand.

In wireless mesh network systems designed for low power, sensor/actuator-based applications, many devices in the network must be powered by long-life batteries or by low power energy-scavenging power sources. Power outlets, such as 120 VAC utilities, are typically not located nearby or may not be allowed into the hazardous areas where the instrumentation (sensors) and actuators must be located without incurring great installation expense. The need for low installation cost drives the need for battery-powered devices communicating as part of a wireless mesh network. Effective utilization of a limited power source, such as a primary cell battery which cannot be recharged, is vital for a well functioning wireless device. Batteries are expected to last more than 5 years and preferably as long as the life of the product.

In a true wireless mesh network, each device must be capable of routing messages for itself as well as other devices in the mesh network. The concept of messages hopping from node to node through the network is beneficial because lower power RF radios can be used, and yet the mesh network can span a significant physical area delivering messages from one end to the other. High power radios are not needed in a mesh network, in contrast a point-to-point system which employs remote devices talking directly to a centralized base-station.

A mesh network protocol allows for the formation of alternate paths for messaging between devices and between devices and a data collector, or a bridge or gateway to some higher level higher-speed data bus. Having alternate, redundant paths for wireless messages enhances data reliability by ensuring there is at least one alternate path for messages to flow even if another path gets blocked or degrades due to environmental influences or due to interference.

Some mesh network protocols are deterministically routed such that every device has an assigned parent and at least one alternate parent. In the hierarchy of the mesh network, much as in a human family, parents have children, children have grandchildren, and so on. Each device (or "node") relays the messages for their descendants through the network to some final destination such as a gateway. The parenting devices may be battery-powered or limited-energy powered devices. The more descendants a node has, the more traffic it must route, which in turn directly increases its own power consumption and diminishes its battery life.

In order to save power, some protocols limit the amount of traffic any node can handle during any period of time by only turning on the radios of the nodes for limited amounts of time to listen for messages. Thus, to reduce average power, the protocol may allow duty-cycling of the radios between On and Off states. Some protocols use a global duty cycle to save power such that the entire network is On and Off at the same time. Other protocols (e.g. TDMA-based) use a local duty cycle where only the communicating pair of nodes that are linked together are scheduled to turn On and Off in a synchronized fashion at predetermined times. Typically, the link is pre-determined by assigning the pair of nodes a specific time slot for communications, an RF frequency channel to be used by the radios, who is to be receiving (Rx), and who is to be transmitting (Tx) at that moment in time.

Some protocols employ the concept of assigning links to nodes on a regular repetitive schedule and thereby enable regular delivery of updates and messages from devices in the network. Some advanced TMDA-based protocols may employ the concept of multiple active schedules, these multiple schedules running all at the same time or with certain schedules activated/deactivated by a global network controller as the need arises. For example, slow active schedules link nodes sending messages with longer periods of time (long cycle time) between messages to achieve low power consumption. Fast active schedules link nodes sending messages more rapidly for better throughput and lower latency, but result in higher power consumption in the nodes. With protocols that allow multiple active schedules, some schedules could be optimized for upstream traffic, others for downstream traffic and yet others for network management functions such as device joining and configuration. Globally activating/deactivating various schedules throughout the entire network in order to meet different needs at different times provides a modicum of flexibility for achieving advantageous trade-offs between power consumption and low latency, but applies the same schedule to all nodes and thus does not provide local optimization.

In a synchronized system, nodes will have to wait to transmit until their next predetermined On time before they can pass messages. Waiting increases latency, which can be very detrimental in many applications if not bounded and managed properly. If the pair of nodes that are linked together are not synchronized properly, they will not succeed in passing messages because the radios will be On at the wrong time or in the wrong mode (Rx or Tx) at the wrong time. If the only active schedule has a long cycle time, the time between scheduled links will be long and latency will suffer. If a fast schedule is activated, the time between scheduled links will be short but battery life will be measurably reduced over time.

Some protocols allow running a slow global schedule in the background and globally activating/deactivating an additional fast schedule. Since it takes time to globally activate a fast schedule throughout the entire network and get confirmation back from all nodes that they have heard the global command, the network or sub-network remains in the less responsive mode during the transition time. Furthermore, with a globally activated fast schedule, power is wasted in all the parenting nodes in the network, even those whose descendants will not benefit from the fast schedule. These unappreciative parent nodes must listen more often on the global fast active schedule (i.e. turn their radios On to Rx more often); even though their descendants have nothing extra to send that a regular active schedule would not suffice in that portion of the network.

Some protocols may limit the number of descendants a node can have, thereby reducing the load the node must support. Other protocols may employ a combination of all of these measures to reduce average power consumption. All of these power-saving measures have the effect of reducing the availability of the nodes in the network to do the work of passing messages, thereby increasing the latency of messages delivered through the network. Duty-cycling the radio increases latency. Hopping messages from node to node increases latency. Increasing hop depth (hop count) by limiting the number of descendants increases latency. Running a slow active schedule (long cycle period) increases latency. Even globally activating a fast active schedule takes time. It is likely that the value of information diminishes with time, so the longer the latency, the less valuable the information may be.

Improvements to the protocol to reduce the trade-off between power consumption and latency are very valuable, because they allow the same protocol to be used for a wide variety of end applications without user intervention and configuration. Improvements that provide local optimizations over global optimization are the most flexible and most valuable.

BRIEF SUMMARY OF THE INVENTION

An improvement to mesh network routing can be implemented by employing a simple form of demand-based routing. A parameter which indicates the depth of the pending message queue (e.g. number of pending messages) in the sending device can be passed from node to node on a hop-by-hop basis, as part of the network message header information located in each message packet. This information is indicative of the unmet message demand being placed on the network, or a part of the network, by the devices in the network, or sub-network. The message buffer queue parameter (BQ#), can be a normal part of the network message header and included with every message sent throughout the mesh network. The nodes in the network, or sub-network, respond to the unmet demand without any global reconfiguration by selectively allowing more traffic to occur in a portion of the network in a given period of time. This allows the network to selectively and locally increase traffic capacity until the demand is met, and then lets the network revert to a lower power steady-state mode of operation. Since this demand/response mechanism is built into the protocol and is activated locally in the network and not globally, nodes in the network that do not need to operate at the higher traffic capacity do not pay the penalty of higher power consumption.

DETAILED DESCRIPTION

Figure 1:
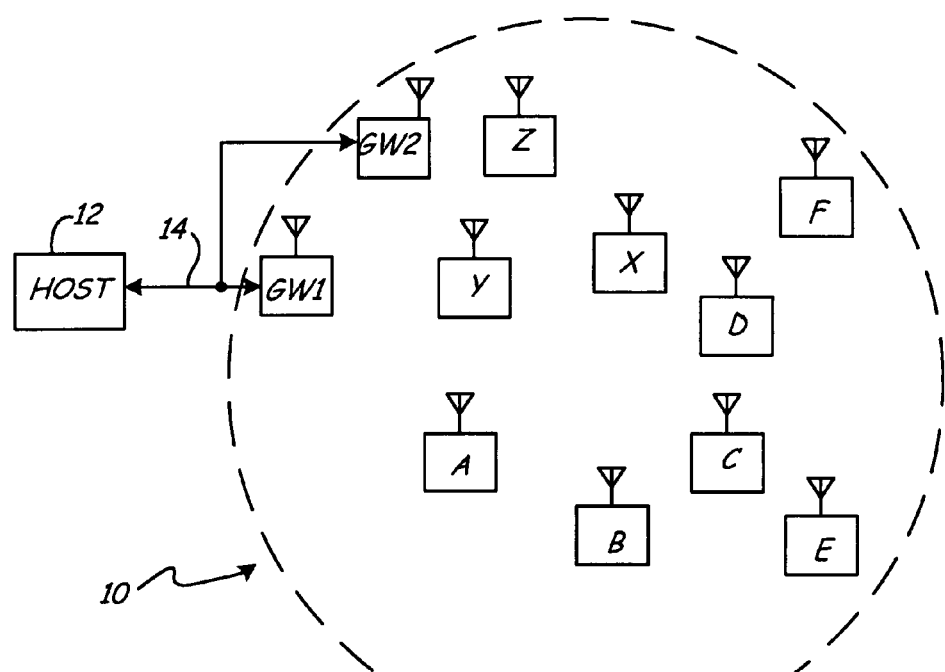
FIG. 1 is a block diagram showing a mesh network.

FIG. 1 shows mesh network 10, which includes gateway nodes GW1 and GW2 and nodes A, B, C, D, E, F, X, Y, and Z. Each node includes a radio transceiver for wireless communication, and a power source, such as a long life battery or low power energy scavenging source. In addition, the nodes may include sensors or actuators with associated signal processing circuitry, and control circuitry for controlling operation of the node, including the time schedule on which the RF transceiver is active.

Gateway nodes GW1 and GW2 interface mesh network 10 with host computer 12 over high speed network 14. High speed network 14 may be a wired network, such as Ethernet, Profibus, Foundation Fieldbus, Modbus, DeviceNet, etc., or a separate wireless network, such as Wi-Fi, WiMAX, etc. Messages may be transmitted from host 12 to gateway node GW1 or GW2 and then to a selected node of mesh network 10 over one of several different paths. Similarly, messages from individual nodes of mesh network 10 are routed through mesh network 10 from node to node over one of several paths until they arrive at gateway node GW1 or GW2 and are then transmitted to host 12 over high speed network 14.

Figure 2:
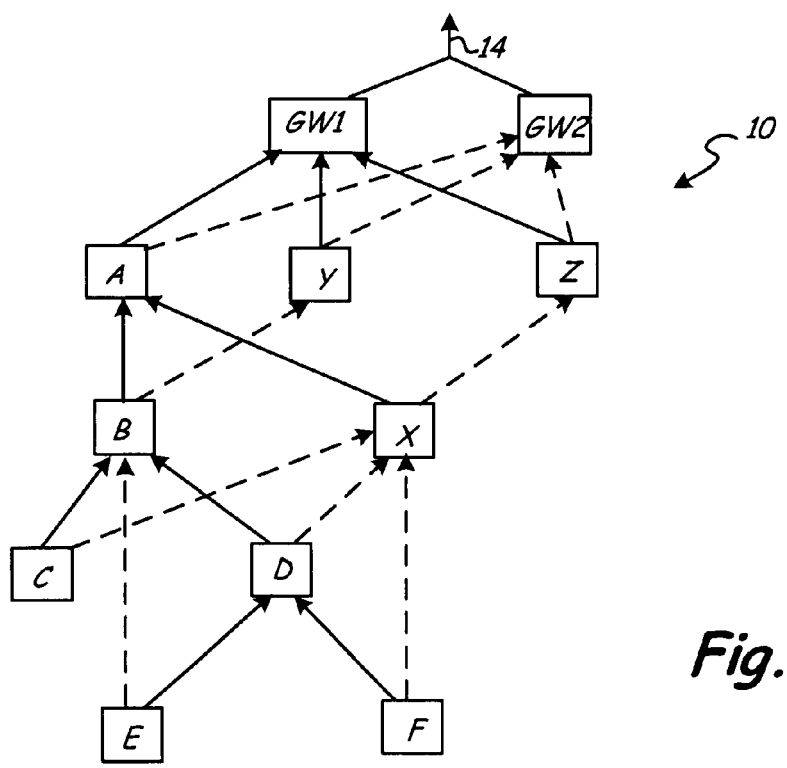
FIG. 2 illustrates a hierarchy of nodes within the mesh network for transmitting messages to a gateway node.

FIG. 2 provides an example of a hierarchy of nodes within mesh network 10 for transmission of messages from the nodes to host 12. A similar hierarchy can be used for transmission of messages from host 12 to the nodes.

In the hierarchy shown in FIG. 2, node A is parent to node B and node B has two children, namely nodes C and D (i.e. nodes C and D are grandchildren to node A). Assume node B has a need to send data to node A. The data may be generated from within node B itself or may be data that node B needs to forward which it received from its children, nodes C and D, or even data forwarded from its grandchildren, nodes E and F. Assume that the message traffic being generated and being routed through these nodes is sometimes smooth and regular and sometimes demanding and irregular. In accordance with one aspect of the invention, when node B sends a message to node A, it also includes the variable BQ# declaring the number of pending messages node B has stored in its internal message buffer. For example, a BQ#=2 sent by node B would indicate to node A that there is still two pending messages in the message buffer of node B. Two pending messages in node B may result, for example, from one pending message from node C and one from node D (or node E or node F) or the two more pending messages may be from node B itself. There is no reason for the receiving node (in this example, node A) to know which node originated the pending messages. All the receiving node needs to know is that the pending messages are there at node B and are waiting to be sent.

Normally, a predetermined global schedule used for network messaging and routing which is optimized for low power nodes would employ a regular active schedule (i.e. longer cycle time). This global regular active schedule comes at the expense of slower response and longer latency to the message information. Using a global fast active schedule, the parent is scheduled to listen for messages from its children quite often thereby improving response and reducing latency. However, listening more frequently requires more power and reduces battery life.

Using the BQ# passed from child node to parent node indicates to the parent node how often it really needs to turn its radio On to listen for messages from its children (and by proxy from all its descendants). If the child node has many incoming messages or generates many messages quickly and cannot empty its message buffer fast enough, the child node will eventually store messages deeper and deeper in its buffer. The BQ# will increase each time the child node receives a message or generates a message and stores the message in its message buffer. The BQ# will decrement by one every time the child node receives an acknowledgement message from its parent indicating that the parent received the transmission correctly.

Since the BQ# is part of the message header being sent with each packet, the receiving (parent) node will decide if it can help meet the extra message demand. If so, the receiving node activates the fast active schedule for that link and starts to listen on the fast active schedule that has been pre-determined for the two nodes. In other words, the receiving node will activate the fast active schedule for the link between itself and its child based on input (the BQ#) provided by the sending node and based on its own capacity. The receiving node will then send a special acknowledge message (ACK+) back to the sending node indicating that it received the message and that it is now in fast active schedule mode.

When the message buffer queue parameter indicates that the current message is the last pending message (BQ#=1), there are no other pending messages. Based on receiving this knowledge by receipt of the latest BQ#, the receiving node knows it does not have to listen any longer on the fast active schedule and can turn its radio off until the next regularly scheduled time (i.e. revert to the regular active schedule).

According to one embodiment of the present invention, a global regular active schedule (consisting of a regular pattern of pre-determined On and Off times between devices) is running in the background of each node that is part of mesh network 10. This is necessary to insure that all messages can be transmitted and received at some regular interval, even by devices that have inactivated their fast active schedule mode. The regular active schedule is global to the network and cannot be deactivated locally by any individual node.

A protocol may employ a message acknowledgement mechanism so the sending node can determine that its message was received properly. The receiving node checks the incoming message to see if it is addressed and framed properly and checks it for integrity and if deemed correct sends an immediate response back to the sending node in the form of an acknowledgement message (ACK or ACK+). The sending node can then clear the sent message from its internal buffer upon receipt of a proper acknowledgement message from the receiving node. If the transmitted message is not acknowledged within a given amount of time, the sending node can decide to retransmit the message at some future pre-scheduled time. As mentioned, a special ACK+ message sent back from the receiving node to the sending node indicates to the sending node that the receiving node will be listening in fast active schedule mode and is ready to receive more messages quickly. In other words, the receiving node then begins to listen in the next pre-determined fast active schedule time slot as well as the pre-determined regular active time slots, since the schedules overlap. If the receiving node does not hear a transmission within a given number of fast active schedule time slots or after a predetermined amount of time, it automatically deactivates the fast active schedule on a link by link basis and reverts to regular active schedule mode to save power. Thus, the nodes will be low power and yet responsive to variations in local traffic.

According to one aspect of the invention, the links in the fast active schedule are activated/deactivated by the nodes themselves and not by a master network controller. This makes the mechanism an upstream, bottom-up process. The message activity ripples up through network 10 starting from the originating node and migrating to the data sink node(s) (e.g. gateway(s)). In the example shown in FIG. 2, when mesh network 10 is running normally, the buffer in node E empties and fills the buffers in node D and node B. The buffer in node F empties and fills the buffers in nodes D and X. The buffers in nodes C and D empty and fill the buffers in nodes B and X. The buffer in node B empties and fills the buffer in nodes A and Y. The buffer in node X empties and fills nodes A and Z. The buffers in nodes A, Y and Z empty to the buffer in gateway nodes GW1 and GW2. Gateway nodes GW1 and GW2 can be serviced very quickly by the gateway application running on host computer 12. Each gateway node GW1, GW2 can be considered as a data sink for all the network messages directed toward it, and it is designed with enough capacity and capability so that it is not normally a bottleneck in mesh network 10.

One example of an application for the locally activated first active scheduling used in wireless mesh network 10 is wireless remote device diagnostics, such as from a digital valve controller (DVC) or radar level gauge or a vibration monitor. DVC diagnostic files can be as large as 32 Kbytes of data. At 70-80 bytes of payload per message common to typical wireless protocols, over 400 message packets are required to complete the file transfer. It would take several hours to upload such a large diagnostic file to a host system using a typical wireless mesh network protocol. Globally activating a fast active schedule throughout the entire network would greatly speed the upload process, but those nodes that are not actively participating in the upload message path would then burn power unnecessarily. Using locally activated fast active scheduling with the message buffer queue mechanism described, the routing bandwidth on the path from the originating DVC node to the data sink at gateway node GW1, GW2 increases dynamically with demand.

Assume a host system application (running on host 12) connects through gateway GW1 or GW2 and requests that a DVC located at node E perform a self-diagnostics routine. To do so, a diagnostic request message is passed through gateway GW1 or GW2 and downstream through network 10 to node E. For example, the path may be host 12→GW1→A→B→D→E or host 12→GW1→Y→B→E. A response message returns to gateway GW from the DVC at node E, for example via the path E→D→X→Z→GW1 (or GW2)→host 12, indicating it is complying with the request and beginning to generate the diagnostics file. The host application then sends an upload request message to the DVC at node E to start the upload process of the diagnostics file. As the DVC generates the diagnostics file, it segments the diagnostics file into small sequentially numbered data packets, typically 70-80 bytes each, and begins to fill its message buffer with data packets. The DVC node will fill its message buffer quickly at this point in the process because the outgoing transmission of messages is still scheduled on the slower global regular active schedule. When the message buffer is full, the process of transferring data from the diagnostics file into the message buffer stops until a message is sent successfully and acknowledged, as explained next. When the DVC device (node E) successfully transmits the first portion of the file in its first outgoing message to one of its parents (assume node D in this example) it includes the message buffer queue number (BQ#). The BQ# of node E would probably equal some maximum value at this point in the example, indicating the DVC device has much more information ready to send. Assume node D receives the message packet and then examines the BQ# it receives from node E. Seeing a large value for BQ#, node D decides that it can handle more traffic, based on its own knowledge of its capabilities and power resources, and turns on its fast active schedule. It then sends an ACK+ acknowledgement back to node E indicating it is ready to receive more messages on a faster schedule. Node E clears that first message packet from its buffer upon receipt of the acknowledgment from node D, making room for another packet to be loaded into its message buffer from the large diagnostics file and then starts transmitting messages to node D based on the fast active schedule. This causes the message buffer in node D to fill up quickly because it can accept messages as inputs faster than it can output them. When node D's message buffer is full, node D refuses to acknowledge the receipt of another message from node E, and the upload process stalls temporarily.

The upload process continues again when node D transmits a successful message to one of its parents (either node B or node X) on the regular active schedule. Included in this upstream message is node D's BQ#, which is probably set at a maximum value at this point in the process. For discussion, assume node B receives the first uploaded message packet E→D→B. Assume node B receives the message properly from node D and examines the BQ# from node D. Seeing it is a large value, node B must decide if it can handle more work offered by node D. Assume node B decides it cannot activate its fast active schedule because it knows it is powered from a limited power source or that its battery is low. Node B will then send a regular ACK acknowledgement message back to node D indicating it is still on the regular active schedule and did not activate its fast active schedule. Node B will then continue to pass messages to its parents, nodes A and Y, using the regular active schedule. Message packets will pass E→D→B→A→GW1 (or GW2) or E→B→A→GW1 (or GW2) and E→D→B→Y→GW1 (or GW2), but the traffic will be bottle-necked at node B.

In the regular active schedule, every node is programmed to send some messages to each parent at least once each cycle. Therefore, node D will send some of its messages to its other parent, node X, at least once during each regular active schedule. Assume node X receives the message properly from node D. Node X examines the BQ# it receives from node D. Seeing a large BQ# value, node X must decide if it can handle the extra work offered by node D. Assume node X has more capability than node B, and it decides to activate its fast active schedule. Then node X sends an ACK+ message back to node D indicating it has received the message and has activated its fast active schedule. Node D receives the ACK+ message and knows that it can begin to send messages to node X more quickly than to node B. Sending messages to node X quickly fills up the message buffer in node X and the upload process stalls temporarily again.

Node X sends message packets to its parents, nodes A and Z, on the regular active schedule. Just as in the previous discussion, nodes A and Z must decide if they can handle the extra work offered by node X. If either one activates its fast active schedule and sends an ACK+ to node X, the fast upload process resumes quickly filling the buffers in node A (or node Z). Gateway node GW is the most capable node in network 10. It always has the fast active schedule running and always responds with ACK+ acknowledgements to messages it receives. The upload of packets E→D→X→A→GW1 (or GW2) or E→D→X→Z→GW1 (or GW2) occurs quickly, and the result is that a high speed upload path has been fully established within a single global regular active schedule cycle.

The high speed path(s) will persist as long as the supporting nodes allow it to continue, or until the diagnostics file transfer has been completed and the buffers are empty. When the buffer of node E has just the last remaining message to transmit, its BQ# will drop to BQ#=1 and then to BQ#=0 when it receives back an ACK message. Upon receipt of this last message, node D can quickly deactivate its fast active schedule link with node E and revert to the global regular active schedule link. Node D will still keep the upstream active schedule link open with node X until it can empty its own message buffer. Upon receipt of the final acknowledgement (ACK or ACK+) message from node X, node D will deactivate the fast active schedule link with node X. The same occurs for nodes X, A and Y as their message buffers empty out.

By chance, node B may receive the last packet of the file transfer instead of node X, since it is still communicating with node D on the regular active schedule. Node X needs a way to shut off the fast active schedule due to inactivity. Preferably, a time-out mechanism built into all nodes will deactivate their fast active schedule after a given period of inactivity. In this example, where node B received the last file transfer packet from node D, nodes X and Z will time-out after a given period of inactivity, deactivate their fast active schedule and revert to the global regular active schedule only. Either node A or Y will relay this last packet from node B to gateway node GW1 or GW2 and deactivate its fast active schedule when it is done. The alternate node, node Y or node A as the case may be, will time-out due to inactivity. The time-out period may be strictly time-based or may be determined by counting a fixed number of fast active frame cycles.

In the above example, the nodes B, C and F are only sending on the slower regular active schedule and therefore are not burning more power than necessary. Node B made the choice not to go to fast active schedule because of resource limitations, whereas nodes C and F were never confronted with the need to activate their fast active schedules because they are not on the upstream path from node E to gateway node GW1 or GW2.

The need to establish a fast hop path through the network may originate within any device in the network, rather than from the gateway or host-based application attached to gateway node GW1 or GW2. Having a locally activated fast active schedule is much more responsive to these needs than a globally activated fast active schedule and allows the network to self form sub-networks within the main network.

Local activation of a fast active schedule based upon localized demand provides a number of important advantages according to various embodiments. First, it facilitates self-forming of sub-networks that are locally activated, self aware, and self-extinguishing.

Second, the local activation is simple to implement with low overhead (the BQ#) in the network message header.

Third, the local activation is adaptable to low power nodes, and to low power networks. It allows low latency sub-networks to form in the midst of a low power network.

Fourth, the local activation is dynamic. It adapts to changing conditions at nodes of the network, it adapts to changing demand to add bandwidth as needed and allowed, and it uses power when available at individual nodes to reduce latency.

Fifth, the sub-networks that are formed remain coordinated with the global regular active schedule that runs in background. This prevents collisions and conflicts within the system.

Sixth, the local activation of a fast activation schedule can occur in either downstream traffic from host 12 or upstream traffic toward host 12. Benefits of locally activating the fast active schedule on a link by link basis are applicable to both directions of communication.

Seventh, the local activation is applicable to networks having one, two or more gateways.

Although the present invention has been described with reference to preferred embodiments, workers skilled in the art will recognize that changes may be made in form and detail without departing from the spirit and scope of the invention.

The invention claimed is:

1. A method of operating a wireless mesh network having a plurality of nodes capable of transmitting and receiving messages, the method comprising:
synchronizing the nodes of the network to a global regular active schedule that defines when messages can be transmitted and received by the nodes; and
locally synchronizing a transmitting node and a receiving node to a fast active schedule based upon a level of a transmit queue of the transmitting node to send messages, wherein the fast active schedule links nodes for communicating messages more rapidly than with the global regular active schedule.

2. The method of claim 1 wherein locally synchronizing comprises:

transmitting a message containing a parameter that indicates a depth of a pending message queue in the transmitting node; and determining at the receiving mode whether to operate in the fast active schedule with the transmitting node based on the parameter.

3. The method of claim 2 wherein locally synchronizing further comprises:

transmitting an acknowledgment from the receiving node to the transmitting node indicating whether the transmitting node can transmit a further message to the receiving node on the fast active schedule.

4. The method of claim 2 wherein the receiving node determines whether to operate in the fast active schedule based upon the parameter and power resources of the receiving node.

5. The method of claim 2 wherein locally synchronizing further comprises:

discontinuing the fast active schedule by the receiving node not acknowledging receiving a message from the transmitting node when a pending message queue of the receiving node is full.

6. The method of claim 1 and further comprising:

deactivating the fast active schedule of a node after a period of inactivity at that node.

7. The method of claim 6 and further comprising:

returning to the global regular active schedule at the node upon deactivating the fast active schedule at the node.

8. A method of communicating messages in a wireless mesh network having a plurality of nodes with transmit queues, the method comprising:

operating nodes to transmit and receive messages according to a global regular active schedule; and locally activating a fast active schedule between a first, transmitting node and a second, receiving node based upon the queue depth of the first node, wherein the fast active schedule allows communicating messages between the first and second nodes more rapidly than with the global regular active schedule.

9. The method of claim 8 wherein locally activating comprises:

transmitting a message from the first node to the second node, the message including an indication of a number of messages the first node has ready to send; and determining at the second node whether to activate the fast active schedule based upon the number of messages the first node has ready to send and resources of the second node to handle the messages.

10. The method of claim 9 wherein locally activating further comprises:

transmitting an acknowledgment from the second node to the first node indicating whether to use the fast active schedule for a next message.

11. The method of claim 8 and further comprising:

locally deactivating the fast active schedule.

12. The method of claim 11 wherein the second node locally deactivates the fast active schedule in response to a message indicating the first node has no further message ready to send.

13. The method of claim 11 wherein the second node locally deactivates the fast active schedule when a message queue of the second node is full.

14. The method of claim 11 wherein the second node locally deactivates the fast active schedule upon not receiving a message from the first node within a timeout period.

15. The method of claim 8 wherein the first and second nodes continue to operate in background according to the global regular active schedule while the fast active schedule is locally activated.

16. A wireless mesh network comprising a plurality of nodes capable of transmitting and receiving messages; characterized by:

each transmitting node including, as part of a message, a parameter that indicates a depth of a pending message queue in the transmitting node; and each receiving node determining if it will activate a fast active schedule for receiving future messages from the transmitting node based solely upon the parameter included in the message received from the transmitting node, wherein the fast active schedule allows communication of messages more rapidly than with a global regular active schedule.

17. The network of claim 16 wherein the receiving node locally activates the fast active schedule with an acknowledgment of the message received from the transmitting node.

18. The network of claim 16 wherein the receiving node locally deactivates the fast active schedule based upon at least one of message inactivity, an indication from the transmitting node that it has no further messages to send, and a queue of messages to be sent by the receiving node being full.

19. The network of claim 16 wherein the nodes operate according to the global regular active schedule for transmitting and receiving messages except where a fast active schedule has been locally activated between transmitting and receiving nodes based upon local demand.

\* \* \* \* \*